INVENTORS
WILLIAM L. MACKIE
EDGAR D. WILSON

BY

G. Baxter Warner
ATTORNEY

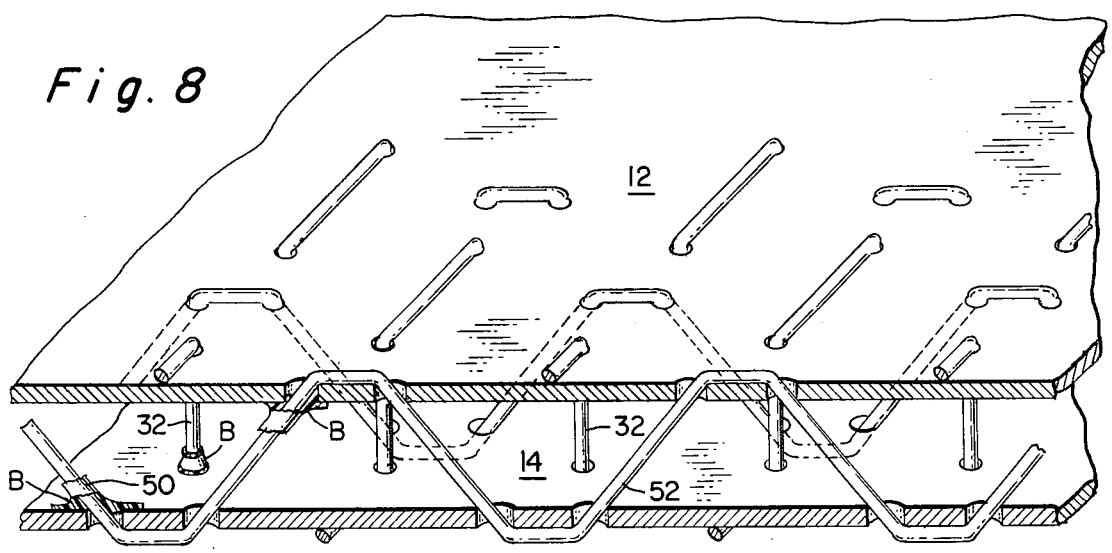
Fig. 8
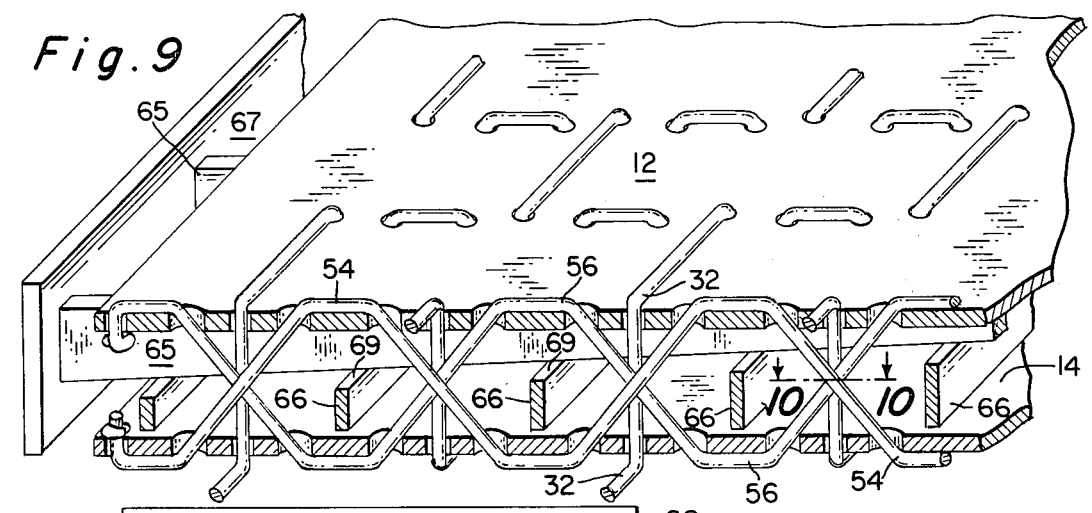
Fig. 9
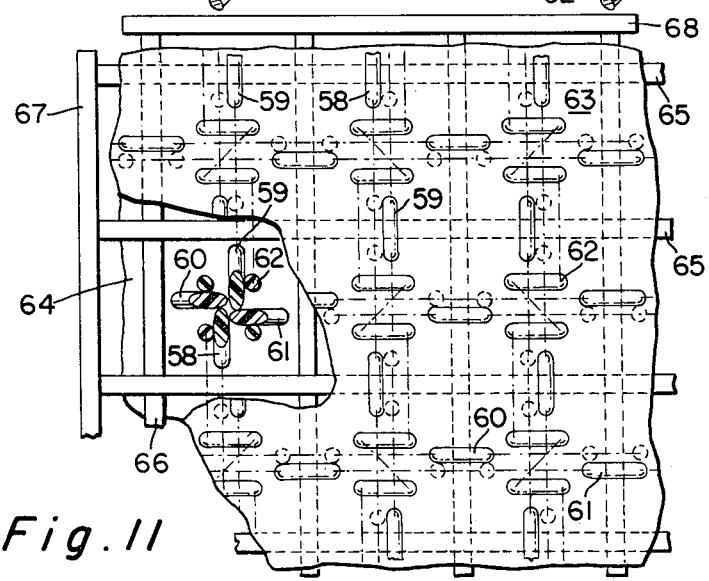
Fig. 11
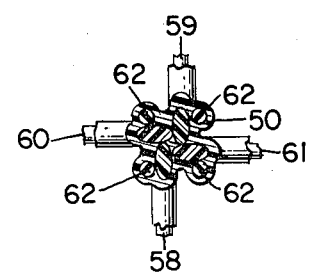
Fig. 10
Fig. 12

United States Patent Office 3,579,411
Patented May 18, 1971

3,579,411
FILAMENT REINFORCED STRUCTURE AND
METHOD OF MAKING
William L. Mackie, 394 Court Ave., and Edgar D. Wilson,
5239 Aurora Drive, both of Ventura, Calif. 93003
Filed Sept. 27, 1967, Ser. No. 671,157
Int. Cl. B32b 7/08
U.S. Cl. 161—53                                    1 Claim

ABSTRACT OF THE DISCLOSURE

A lightweight, high strength structure and method of making same. Spaced panels are interconnected by high tensile strength flexible filaments of glass fiber or metal which filaments penetrate through the panels, and are woven back and forth. The portions of the filaments extending between the panels are subsequently rigidized by the addition of a coating which, when solidified, imparts substantial compressive strength. To counter shear forces certain filaments may be arranged to slant in the direction of anticipated stress. Since the filaments pass through and overlie portions of the panels they effectively counter delamination or peeling.

---

The invention described herein may be manufactured and used by or for the Government of the United States of America for governmental purposes without the payment of any royalties thereon or therefor.

BACKGROUND OF THE INVENTION

(1) Field of the invention

This invention relates to structural members and more particularly to high strength, lightweight lamellate structures formed by two or more spaced panels which are held together by an interconnecting network of filaments. It is particularly adapted to use for lightweight, high tensile strength panel structures such as missile and airplane wings and fins, fuselage shells, and satellite or space structural applications.

There are distinct advantages in having the space between the panels relatively free and open since this provides desirable qualities of insulation, lightness and soundproofing and permits the utilization of the space for the installation of wiring or piping or the circulation of fluids or gases for cooling, de-icing or other desirable purposes. Obviously these characteristics are of benefit in many other fields as will readily be apparent to those skilled in the art.

(2) Description of the prior art

Heretofore lightweight panel assemblies have been subject to serious tensile strength limitations. The outer sheets of such panel constructions are frequently held together by a honeycomb core or by a series of posts or pins, blobs of adhesive or webs of corrugated or dimpled sheet material and these generally rely upon the strength of a cementitious bond to resist tensile stresses tending to separate the panels. The popular honeycomb type construction is especially subject to peeling of the panel from the honeycomb core to which it is cemented or adhesively secured. Obviously this can be of tremendous consequence when the panel is embodied in an airborne structure such as a wing or fin which during use is subjected to great extremes of vibration, negative pressures, temperature and stress.

SUMMARY

The present invention utilizes high strength filaments of glass, metal or other suitable material as interconnections between structural members such as panels and contemplates such interlacing of same that there is provided a latticework construction wherein these filaments are oriented in a direction best adapted to resist both tensile stress conditions occurring perpendicular to the panels and tangential shearing stress conditions occurring generally along the plane of the panels. Normally such filaments, being flexible, possess little or no compressive strength, however, in the practice of the present invention, after the panels have been assembled such strength is imparted by the application to the filaments of a coating of a material which is convertible to a rigid state. For example, such coating may comprise a thermosetting or thermoplastic resin which when hardened stiffens or rigidizes the filament and imparts compressive strength thereto.

It is therefore an object of the present invention to provide a structural member and method of forming same wherein spaced apart members or panels are interconnected by bonds of high tensile strength to which bonds compressive strength has been imparted.

Another object is to provide such a panel having a filament arrangement and pattern whereby great tensile and shearing strength is achieved.

A further object is to provide a panel construction with high strength to weight ratio wherein delamination or peeling is effectively prevented.

Still another object is the provision of a panel and method of making same wherein panel interconnecting filaments may be prestressed during panel construction to materially increase panel rigidity and strength.

Other objects, advantages and novel features of the invention will become apparent from the following detailed description of the invention when considered in conjunction with the accompanying drawings.

BRIEF DESCRIPTION OF THE DRAWINGS

FIG. 8 is a perspective view partially in section of a panel construction wherein perpendicular filaments of the character illustrated in FIGS. 1, 2 and 3 are supplemented by inclined filaments to improve the shear strength of the panel assembly.

FIG. 9 is a view similar to FIG. 8 showing another arrangement of inclined filaments wherein the number of interfilament contact points is increased. This view illustrates the fixture of FIG. 7 in place.

FIG. 10 is an enlarged detail view of a filament juncture taken along a line substantially corresponding to line 10 of FIG. 9 showing how adjacent filaments may be joined by a common coat or sheath of rigidizing material.

FIG. 11 is a top plan view partially broken away showing two panels having an interpanel stitching pattern which employs inclined or slanting filaments extending lengthwise and crosswise as well as straight through the panel assembly.

FIG. 12 is an enlarged detail view, similar to FIG. 10, of a filament juncture such as is formed by the stitching pattern shown in FIG. 11.

DESCRIPTION OF THE PREFERRED EMBODIMENT

Figure 1:
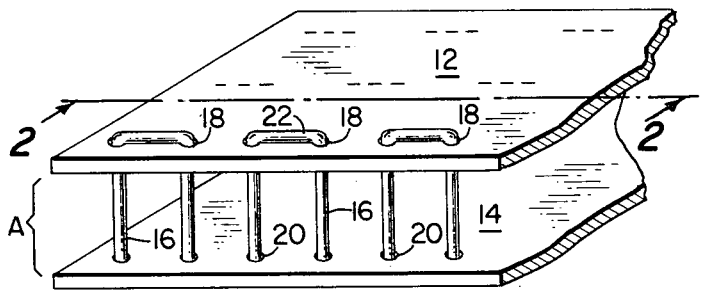
FIG. 1 is a persepctive view of one embodiment of the present invention prior to application of a filament rigidizing coating showing spaced panels stitched together with high tensile strength filaments.

The present invention may be embodied in a construction such as is illustrated in FIG. 1 wherein upper and lower spaced panels 12–14 of relatively stiff material are shown separated a selected distance A, which distance may vary depending upon design requirements. As shown, these panels may be interconnected by filaments, strands, or tapes 16 which, in accordance with the present invention, are preferably relatively inelastic and may be laced or sewn back and forth between the panel members, either through openings generated by the sewing process or through pre-formed openings 18–20 provided in the upper and lower panels respectively. The filaments 16 may be threads, wires, tapes, ribbons, cords or strands and may be composed of glass or metal fibers, silicon carbide fibers, boron fibers or the like which, in use, suitably interlace the panels together as illustrated to effectively supply great tensile strength so as to resist separation, delamination or peeling apart of the panels.

Figure 2:
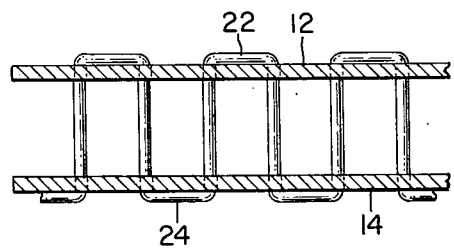
FIG. 2 is a vertical sectional view taken along a line substantially corresponding to line 2—2 of FIG. 1.
Figure 5:
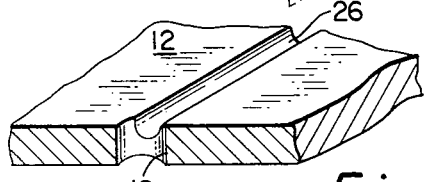
FIG. 5 is an enlarged fragmentary view of a portion of a panel having grooves into which filament stitches may be recessed to provide a smooth outer panel surface.

As shown in the cross-sectional view, FIG. 2, horizontal filament portions 22–24 of each filament may lie closely along the outer surfaces of panels 12 and 14 respectively or, if desired, recesses or grooves 26 may be provided as shown in FIG. 5 to bury the filament loop and provide a relatively smooth outer surface for the panel assembly.

Figure 3:
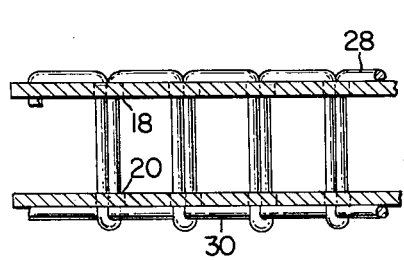
FIG. 3 is a view similar to FIG. 2 but showing the use of a different stitch arrangement.

It will be apparent that various forms of stitching may be employed. FIG. 3 illustrates the two thread lockstitch. With this stitch an upper filament or thread 28 is caught by a lower filament 30. Through suitable adjustment of the tensions of the two filaments the lower may be drawn upwardly through opening 20 in the lower panel to an intermediate point if desired. It will be noted that in each of the arrangements described the panels are interconnected by perpendicular bonds which provide tensile strength for tensile stress applied perpendicularly or normal to the plane of a panel and, when rigidized, these bonds impart compressive strength to the completed panel assembly.

Figure 6:
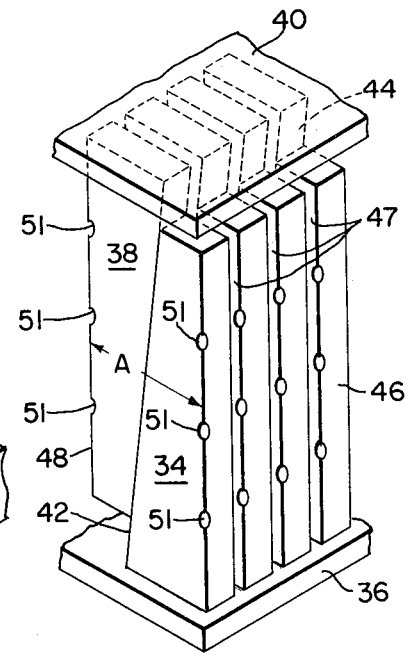
FIG. 6 is a perspective view of one form of jig or fixture which can be employed to retain the panels in spaced apart relationship during the stitching and rigidizing steps.

In practicing the method of the present invention there may be employed any suitable jig or fixture for initially supporting the panels in spaced apart relationship. One suitable fixture is illustrated in FIG. 6 wherein a number of upright wedge fingers 34 are shown mounted on a lower end plate 36. A companion set with similar fingers 38 mounted on upper plate 40 is movable vertically with respect to the other and the wedging action of the contacting inclined faces 42–44 increases the distance A between their oppositely facing parallel outer surfaces 46–48 which distance determines the space between the panels of the finished product.

In practicing the method of the present invention panels are first applied to opposite faces of the fixture of FIG. 6 and the two wedge shaped finger assemblies adjusted to set the interpanel distance A as desired. Thereafter stitches of the desired filament material are sewn through the supported panel members to interconnect the panels by said filaments and to draw the panels tightly against the sides of the fixture. During this operation the sewing needle passes through the slots left between the spaced fingers. It will be apparent that with this arrangement the stitching can occur in a direction either slantwise or directly through the interfinger slots 47 as long as the needle clears the finger sides.

When the panels are sewn or laced together the filaments may be rigidized by the application thereto of a filament enveloping or permeating coating 50. This coating may be thermosetting or thermoplastic in nature or may otherwise be caused to set so that, when hardened, it encapsulates the filaments in a sheath of rigid material. When hard this sheath will have substantial compressive strength which will vary in degree depending upon the characteristics of the coating material selected. It will be apparent that where the filament selected is porous or can be permeated by the coating material an even stronger filament to coating bond can be assured.

The coating material may be of many types. Suitable thermosetting resins include phenolic, polyester, epoxy and urethane resin. In addition to being thermosetting or thermoplastic the resin may incorporate a catalyst or otherwise may be so constituted as to cure at room temperature. Thermoplastic resins may be acrylics, vinyls, polystyrenes and cellulosics and may be appropriately selected to withstand ambient conditions of temperature, moisture, etc. to be expected in the panel's ultimate environment. In addition, the plastics may be of the polyamide type which rigidize upon exposure to air, or they may remain fluid until fixed with other substances such as polyisobutylene and polyethylene or boronfluoride. Whichever coating material is selected, an appropriate rigidizing technique is employed to render it hard and firm so as to impart the necessary rigidity and compressive strength to the filament.

When metal filaments are employed the coating may be a brazing material such as a brazing slurry, or there may be used a plating or dipping process by which a sheath of coating material is placed about the filaments. Also a spray can be utilized to distribute this coating.

Figure 4:
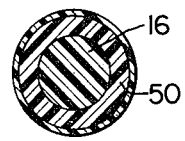
FIG. 4 is an enlarged cross section through a filament after it has been provided with a rigidizing coating.

FIG. 4 illustrates a greatly enlarged cross-section of a filament 16 to which has been added a rigidizing coating 50. It will be apparent that more than one coating may be employed where necessary in order to add to the thickness of the coating about the filament. Additionally, such extra coatings may impart moisture resistance or other desired characteristics when needed.

As mentioned, the selected coating may be applied by dipping, plating, spraying or any other suitable means. If desired spray nozzles 51 may be located at selected intervals along the length of the fingers 34 and 38 as illustrated in FIG. 6. The coating material may be conducted to such spray nozzles by suitable internal passages extending through the fingers to form a suitable supply conduit to which may be connected a pressure producing mechanism or pump and the necessary control valves (not shown).

FIG. 8 shows the addition of slanting or inclined filaments to the perpendicular filaments 32. In this embodiment the panels 12 and 14 are connected by a series of inclined filaments 52 disposed in a pattern which add tensile shear strength and, when rigidized, improve the compressive shear strength. In FIG. 9 inclined filaments 54 and 56 are shown contacting each other and the perpendicular filament 32 to provide even greater strength.

It will be appreciated that a somewhat viscous coating material will adhere between adjacent filament or panel surfaces to form small fillets, braces or voussoirs which greatly reinforce the completed structure. For clarity only a few representative reinforcements have been indicated generally at portions of those figures by the reference character B. These obviously will form wherever filaments approach each other or adjacent panel surfaces and will vary in size and shape depending upon the surface tension characteristics of the applied coating.

In FIG. 10 is shown in cross section the manner in which adjacent filaments 54, 56 shown at line 10—10 of FIG. 9 may be joined at their point of intersection by a common sheath or covering of coating material 50. By providing a coating with sufficient adhesive, cohesive and surface tension characteristics there will be formed, at points where filaments lie in close proximity to each other, certain webs or films which when hard form interfilamentary braces, struts, trusses or reinforcements which cause the filaments to buttress each other. Of course similar reinforcements appear between filaments and adjacent panel surfaces. All of these strengthen and brace the assembled panel structure. Filament ends adjacent the panel edges may be knotted or otherwise anchored as illustrated.

In FIG. 11 is shown a different embodiment wherein multidirectional strength is provided against tangential or shear forces operating along the general plane of the panel assembly. In this embodiment inclined filaments 58, 59 extend up and down the figure and similarly inclined filaments 60, 61 extend at right angles across the figure so that multidirectional shear strength is attained. Upright filaments are provided by filament 62 which is threaded as shown. In order to keep dotted lines to a minimum the path of the filaments has been shown by a single dot-dash line and it will be obvious that upper and lower spaced panels 63, 64 are illustrated with a portion of the upper panel 63 broken away on the left to show how closely eight filament portions can be associated in interference free relationship at the midpoint between the panels. FIG. 12 illustrates how one type of coating material could interlock in rigid fashion the filaments of the broken away portion of FIG. 11. The filament arrangement of FIG. 12 is particularly strong in that many filaments are concentrated for strength in a double pyramid fashion with apices joining and yet the points at which these filaments penetrate the spaced panels are so distributed that such panels are not weakened.

Figure 7:
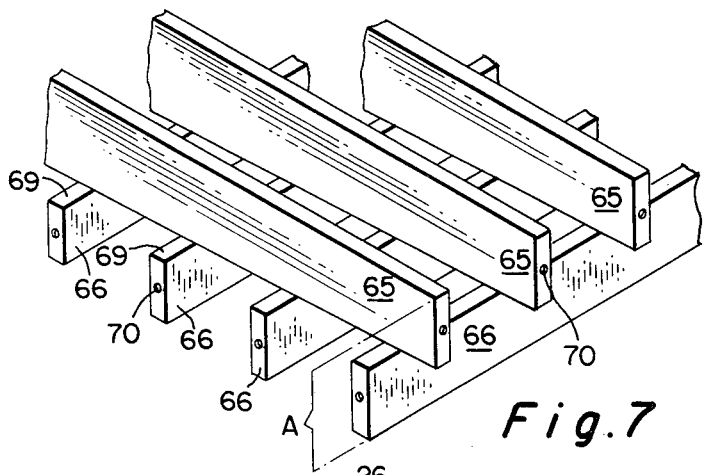
FIG. 7 is a perspective view of a portion of a second fixture arrangement.

To hold the panel members in urged apart relationship so that the panel construction of FIG. 11 can be formed a framework of parallel bars or grid such as is illustrated in FIGS. 7, 9 and 11 may be employed. This support comprises spaced parallel upper fingers 65 and spaced parallel lower fingers 66. The fingers 65 of the upper set are secured together at their base by a cross member 67 while those of the lower set are mounted upon and extend from a similar cross member 68. Each finger 65 of the upper grid set tapers along its length so that it is wider near the base than at the tip. Fingers 66 of the lower grid set may have inclined upper contact faces 69 (FIG. 7) which slant slightly to the left so that these faces match the taper of the undersurface of fingers 65.

It will be apparent that with the grids in overlapping relationship the top and bottom surfaces of both sets of fingers lie in parallel planes and hence panels placed thereagainst are supported in spaced parallel planes. Also, within limits, the interpanel space may be varied by relative movement of the grids so that the inclined surfaces wedge the grids apart. With the grids and panels assembled the method of this invention may be practiced to produce a panel structure by threading both slanting and perpendicular filaments between the parts in an established pattern such as is shown in the various figures.

Since the fingers 65–66 each bridge only a part of the interpanel space they can readily be avoided by the filaments even though the latter slant at substantial angles. It will be apparent that the degree of separation of the fingers and their general cross-sectional contour may vary as required, the main feature being that after the panels are assembled and the filaments are fixed in position each grid may be withdrawn endwise from the panel assembly.

In order to facilitate the placement between the panel members of wires, cables, pipes or similar elongate objects there is provided, at the end of each finger, a tapped hole 70 (FIG. 7) which may be employed to support a small chuck or clamp which in turn may engage the end of such wire, cable or pipe. In use the elongate object may be attached to the end of the appropriate finger just before that grid is withdrawn. The act of withdrawing the grid will thereupon pull such elongate object into place with a minimum of effort or risk of injury to the adjacent filaments.

It will be obvious that, if desired, the grids may be formed of a material which is compatible with the finished panel assembly such as plastic, metal, wood, etc. and may be left permanently in place. This construction provides a maximum of compressive strength. In this instance the coating material may be omitted if desired, or, if used, such material will serve to further anchor the grids in place.

It will be apparent that both the method of making this core assembly and the fixtures illustrated are particularly adapted to prestressing the filaments so that after a rigidizing coating is applied and hardens the filaments will remain in tension. Such prestressing provides a substantially stronger construction. Obviously the amount of prestressing that is best will vary with the filament and with the creep resistance of the coating or rigidizing material.

With either the fixture of FIG. 6 or FIG. 7 the prestress tension is preferably applied after the filaments are in place and before the coating is applied. For this operation the wedge members 34 and 38 of FIG. 6 or the grid members 65 and 66 of FIG. 7 may be shifted to increase the interpanel distance A, take up any slack in the filaments and impose a stress thereon of a degree which has been predetermined to be appropriate for the type and number of filaments employed.

Obviously many modifications and variations of the present invention are possible in the light of the above teachings. It is therefore to be understood that within the scope of the appended claim the invention may be practiced otherwise than as specifically described.

What is claimed is:

1. A structural arrangement comprising:
   - means for maintaining a preselected relationship between a pair of sheet-like planar members composed of relatively rigid material, disposed in spaced-apart essentially parallel fashion, in the presence of forces tending to alter such relationship, said means comprising:
   - a plurality of filaments composed of flexible material lying principally in the region between said spaced-apart members, each of said filaments interconnecting said pair of members at a plurality of points;
   - selected particular ones of said filaments first passing successively in different directions through a pair of openings in one of said members, thence through said region to the other of said members in linear fashion and at an angle of less than 90° to the plane of said members, thence passing successively in different directions through a pair of openings in the remaining one of said members, thence returning through said region to said one member in linear fashion and at an angle of less than 90° to the plane of said members, and thence passing successively in different directions through a further pair of openings in said one member, following which such interconnecting arrangement is repeated in cyclic fashion;
   - selected other ones of said filaments first passing successively in directions different from those of said selected particular filaments through a pair of openings in one of said members, thence through said region to the other of said members in linear fashion and at an angle of approximately 90° to the plane of said members, thence passing successively in different directions through a pair of openings in the remaining one of said members, thence returning through said region to said one member in linear fashion and at an angle of approximately 90° to the plane of said members, and thence passing successively in different directions through a further pair of openings in said one member, following which such interconnecting arrangement is repeated in cyclic fashion;
   - said plurality of filaments interconnecting said pair of members each having thereon a coating adapted to harden to thereby rigidize said filaments and hence maintain the pre-selected relationship of said members regardless of the presence of forces tending to alter such relationship;

each of said pair of members having a plurality of grooves formed in the outer surface thereof to respectively receive the filament loops and hence provide a smooth outer surface for the assembly.

References Cited

UNITED STATES PATENTS

| | | | |
|---|---|---|---|
| 3,328,218 | 6/1967 | Noyes | 161—53X |
| 3,298,152 | 1/1967 | Lockshaw | 52—650 |
| 2,762,739 | 9/1956 | Weiss | 161—142UX |

OTHER REFERENCES

Johnson et al., "The Theory and Practice of Modern Framed Structures," 1902, pp. 57–58.

JOHN T. GOOLKASIAN, Primary Examiner

J. C. GIL, Assistant Examiner

U.S. Cl. X.R.

52—560; 161—69, 78, 143